Aug. 9, 1955  J. A. HALL  2,715,158
SIGNALING SYSTEM

Filed Oct. 31, 1951  8 Sheets-Sheet 1

| FIG. 1 | FIG. 6 | FIG. 7 | FIG. 8 |

| FIG. 2 | FIG. 10 | FIG. 11 | FIG. 8 |

| FIG. 3 | FIG. 6 | FIG. 7 | FIG. 12 | FIG. 13 | FIG. 7 | FIG. 8 |

| FIG. 4 | FIG. 10 | FIG. 11 | FIG. 12 | FIG. 13 | FIG. 7 | FIG. 8 |

| FIG. 5 | FIG. 6 | FIG. 7 | FIG. 12 | FIG. 13 | FIG. 7 | FIG. 12 | FIG. 13 | FIG. 7 | FIG. 8 |

INVENTOR.
JOHN ALDEN HALL
BY
ATTORNEY

Aug. 9, 1955 J. A. HALL 2,715,158
SIGNALING SYSTEM
Filed Oct. 31, 1951 8 Sheets-Sheet 2

INVENTOR.
JOHN ALDEN HALL
BY
J. L. Bower
ATTORNEY

Aug. 9, 1955

J. A. HALL 2,715,158

SIGNALING SYSTEM

Filed Oct. 31, 1951

INVENTOR.
JOHN ALDEN HALL
BY
*J. L. Bower*
ATTORNEY

Aug. 9, 1955    J. A. HALL    2,715,158
SIGNALING SYSTEM
Filed Oct. 31, 1951    8 Sheets-Sheet 5

INVENTOR.
JOHN ALDEN HALL
BY
ATTORNEY

Aug. 9, 1955   J. A. HALL   2,715,158
SIGNALING SYSTEM
Filed Oct. 31, 1951   8 Sheets-Sheet 6

INVENTOR.
JOHN ALDEN HALL
BY
J. L. Bowes
ATTORNEY

2,715,158

SIGNALING SYSTEM

John A. Hall, Summit, N. J., assignor to Stromberg-Carlson Company, a corporation of New York Application October 31, 1951, Serial No. 254,058

3 Claims. (Cl. 179—18)

This invention relates to signaling systems and particularly to small current signaling employed in telecommunication systems.

The object of the invention is to provide station signaling means of a supervisory nature to indicate to the subscriber the readiness of the central office apparatus to receive dial signals particularly in dial systems where the central office selective apparatus is directly operated by the subscriber as in the conventional step by step telephone system.

It is conventional to use a dial tone signal to let the subscriber know when to start dialing, but this dial signal is used for this purpose only. It is the object of this invention to provide a substation signal which will act as a start and a stop means, not only to let the subscriber know when to start dialing, but when to stop or pause where longer connections are being established to wait for other apparatus activated by the extension of a connection thereto to operate and put itself in readiness to receive more dial pulses, when to resume dialing and when the called subscriber has answered.

The invention, in one form, consists of a signal lamp at the subscriber's station which will light up as a signal to start dialing and go out as a signal to stop dialing. In an ordinary local connection where a called subscriber is reached by dialing a four digit number, the lamp will light up when a selector has become connected to the calling line. The lamp will remain dark when the subscriber takes his telephone off the hook and remain dark while the conventional line finder is operating but as soon as the finder connects the first selector to the calling line, the lamp will light up as a start dial signal. The lamp will go dark during the periods when the dial is in use, that is when it is off normal, but will light up again as soon as the next selector or the connector in the train is reached. After the called line number has been completely dialed the lamp will remain lighted but will go dark when the called subscriber answers. The use of such a start dial signal will make the use of the conventional dial tone unnecessary so that the circuit arrangements for this may be eliminated from the first selector circuits.

The start and stop dial signal of the present invention is particularly useful in what might be termed toll dialing where the selector operated by the subscriber is directed to a trunk leading to a distant point. Such trunks terminate at these distance points in a line finder and selector arrangement and since it is not certain that the line finder will always be able to get a selector in condition to receive the next train of pulses in the time taken by a subscriber between dialing two digits a means must be provided to warn the subscriber to pause. Therefore, in accordance with the present invention, when the subscriber notes the glowing of the signal lamp shortly after he has taken his telephone off the hook, he will dial the first digit of the number leading to the distant called subscriber. If, as assumed, the selector is thus directed to a trunk leading to a finder selector link the signal lamp will remain dark after it has returned to normal so that the subscriber is warned not to start dialing the next digit. Shortly thereafter when the link has been connected to the trunk and an incoming selector at the distant point is ready for operation, the start dial lamp will light up again. When the connection is further extended the lamp will light up and go dark in a manner similar to that above described for a local connection.

The present arrangement may be employed over a series of toll lines so that the subscriber may dial what is termed a long distance connection. When he takes his receiver off the hook the lamp will remain dark until the first selector is ready, when it will light up as a signal to start dialing. When by some particular digit dialed the subscriber directs the connection to a finder selector link, the lamp will go dark as a stop dial signal. When a distant incoming selector is ready the lamp will light up as a start dial signal. If the next or some succeeding digit directs the connection to another finder selector link the lamp will go dark again, so that theoretically a connection may be extended over a long distance including an indefinite number of finder selector links.

A feature of the invention is the use of a substation lamp which may be mounted in any one of a number of different ways. Since the lamp is to be used as a start dial signal a preferred way of mounting it would be under the dial number plate which could be of clear or translucent plastic so that the dial numbers would become clearly illuminated and visible when (and only when) the dial is to be used. In an alternative arrangement the lamp could be mounted in a conventional lamp holder under a colored gem lamp cap, in the center of the dial or at any other convenient location near the dial.

Another feature of the invention is the use of a polarized relay in the substation set arranged to respond to current flowing in a given direction. The relay will have an armature and a single back contact and will normally short circuit the signal lamp. Thus, if the signal lamp is connected in series with the substation circuit, it will be effectively connected only into such circuit when the calling subscriber is given the signal to start dialing. During the calling period before the first selector has been made ready, during the actual operation of the dial and during conversation the lamp will be short circuited and its resistance will be excluded from the line circuit, so that maximum line current will flow at these times.

Another feature of the invention is an alternative arrangement of the polarized relay. This, instead of being equipped with an armature and a back contact, may be provided with a latching arrangement to lock the dial mechanically against operation so that the dial may only be operated when the circuits are ready to receive dial pulses. Any conventional arrangement of this nature may be used, but in a preferred embodiment of the invention a latch would be provided which would hold the dial against the return movement. Such a latch would be fashioned so that should the subscriber attempt to force the return thereof the latch would give way, thus preventing any mechanical damage to the apparatus. The subscriber who thus attempted to mishandle the station apparatus could do no damage other than to misdirect the selective apparatus and fail to reach the desired called party.

Another feature of the invention is a line circuit, conventional in every manner except that the battery connections to the line relay are reversed. In most systems the tip of the line is grounded and the ring is connected to battery and the same sort of connections are extended to the line from the selector and connector circuits. In the present arrangements, the line circuit presents battery on the tip and ground on the ring, to which the substation polarized relay will not respond. However, when the line finder has operated and associated the first selector with the calling line the first selector circuit presents ground on the tip and battery on the ring to the calling subscriber and to this the polarized relay will respond. When the line is extended to a finder selector link the line is again reversed and battery is found on the tip and ground on the ring until the incoming selector is made ready. Finally, when the called subscriber responds the line to the calling subscriber is conventionally reversed so that during conversation there will be battery on the tip and ground on the ring to the calling subcriber. In accordance with this feature the line circuit connections to the connector terminals would be reversed, or alternatively the battery supply to the called party would be reversed to hold the start dial signal at the called station from operating during conversation.

Another feature of the invention is the use of a local or other battery supply for the start dial lamp other than the line current. In such an alternative arrangement the polarized relay may have an armature and a front contact to include the lamp in circuit with such local source of current. Any conventional battery supply may be employed, such as dry batteries or a power pack energized by the ordinary electric supply. Alternatively, current for the lamp may be transmitted from the central office to the substation over a derived circuit such as a simplex circuit of conventional design.

Another feature of the invention is the use of a simplex circuit arrangement whereby only the stop and start dial signal lamp is located at the subscriber's station, the polarized relay responding to the several reversals of the line current being located at the central office, preferably in the first selector circuit. This arrangement has the great advantage of holding the substation apparatus to a minimum and limiting such apparatus to elements of a rugged nature which would require little if any maintenance. While the substation lamp under this latter arrangement could be fed over the simplex circuit with alternating current of any convenient frequency it is especially to be noted that the frequency employed may be anywhere within the voice range since with the arrangement hereinbefore described the lamp will never be lighted during the conversation period and hence no noise or tone will be introduced into the talking circuit by, let us say, a poorly designed or unbalanced phantom coil.

Still another feature of the invention is a means for automatically charging a calling subscriber for extended local or toll calls in accordance with the length of the connection. It is conventional to employ a message register individually associated with each subscriber's line, which register is arranged to be operated by the reversal of the line current caused by the answer of the called party. Such an arrangement is left undisturbed in the line circuit of the present invention so that the message register may be operated once for each line reversal encountered including the answer of the called party. The system may therefore be arranged so that when a subscriber dials beyond the limit of the local call charging area he will encounter a line reversal point such as the finder selector link arrangement hereinbefore described and will therefore have one charge registered against his account by the act of successfully breaking out of his local area, another charge being registered when the called party answers. It will be apparent that by this means the subscriber may be automatically charged for the establishment of toll calls in accordance with the length of the connection established.

Other features will appear hereinafter.

The drawings consist of eight sheets having fourteen figures, as follows.

Figures 6, 9, 14:
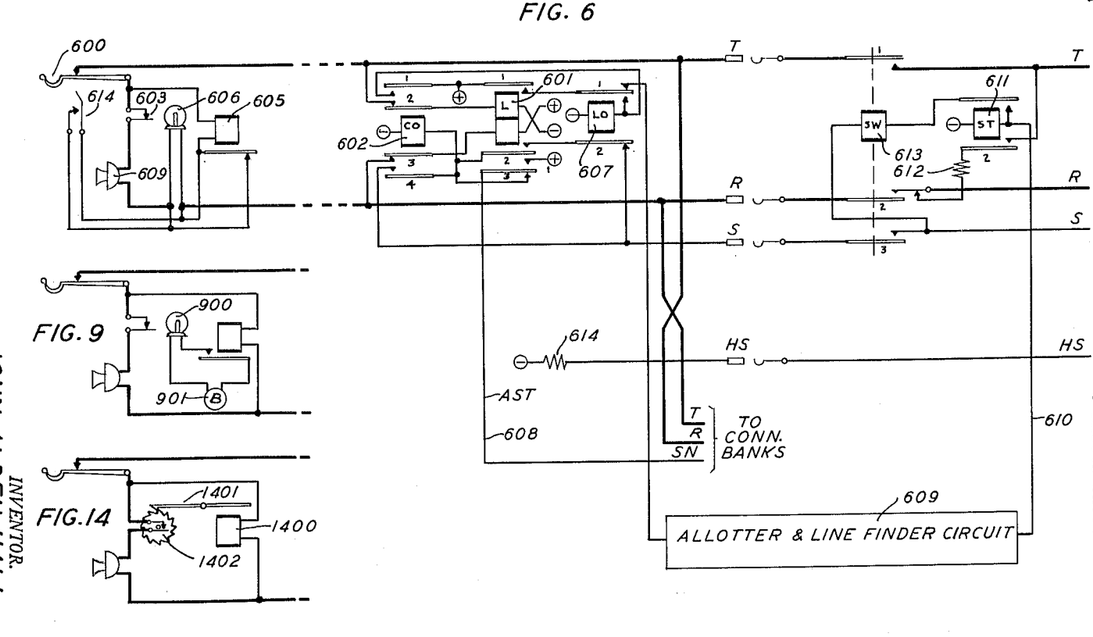
Fig. 6 is a schematic circuit diagram showing the essential elements of a subscriber station, its line circuit and the conventional line finder by which the calling line is connected to a first selector.
Fig. 9 is a schematic circuit diagram showing a different type of substation circuit in which the start dial lamp is operated from a local source of battery instead of using the line current as in Fig. 6.
Fig. 14 is a schematic alternative circuit arrangement in which the dial is normally held locked but is released for operation by the movement of a latch operated by a polarized relay.
Figure 6A:
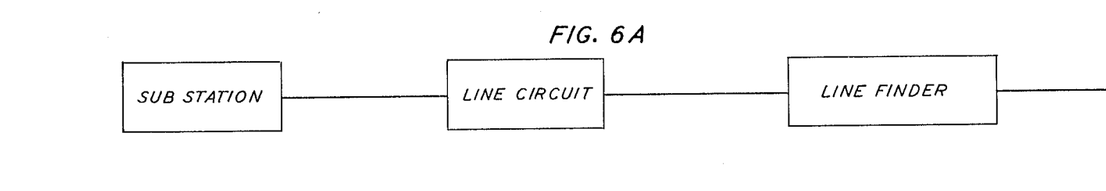
Fig. 6A is a bracketing label for the circuits described in the above Fig. 6.
Figure 10:
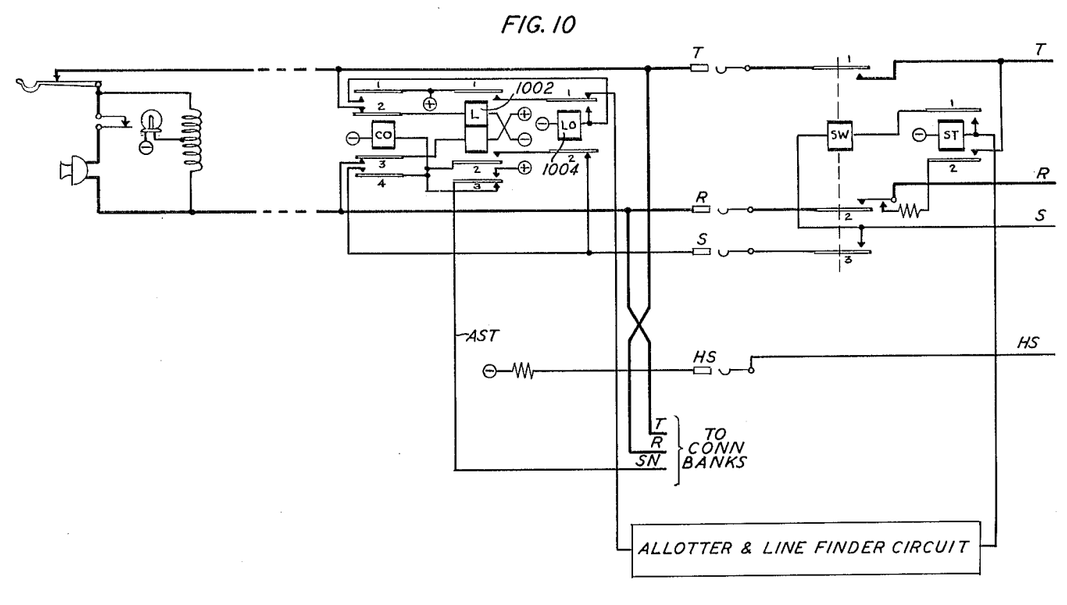
Fig. 10 is a schematic circuit diagram, similar to Fig. 6, showing another species of the invention, using a substation circuit, its line circuit and the essential elements of a line finder circuit by means of which a calling substation may be extended to a selector circuit.
Figure 10A:
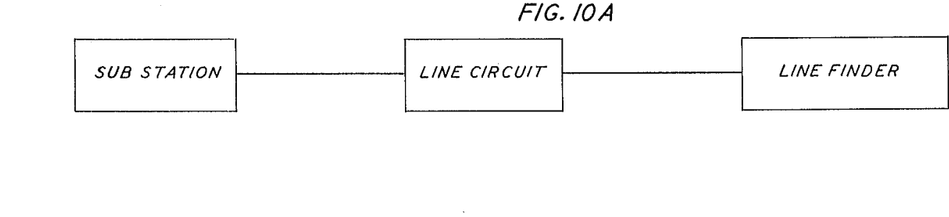
Fig. 10A is a bracketing label for the circuits described in the above Fig. 10.

The present invention resides in the use of a means to signal a calling subscriber when he may or may not use his dial. The preferred form of such a device as shown in Figs. 6, 9 and 10 is a lamp mounted in a conspicuous manner on a subscriber's instrument, preferably in close association with the dial and which when lighted indicates to the calling subscriber that he may proceed to operate the dial. A preferred arrangement is to have parts of the dial made of transparent or translucent material and the lamp so mounted in respect thereto that the dial will glow when the lamp is lighted. An alternative arrangement is to mount the lamp under a conventional jewel lamp cap, colored green to act as a "go" signal.

Figure 1:
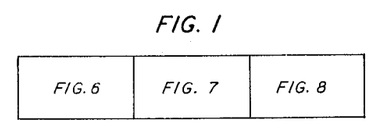
Fig. 1 is a block diagram showing how Figures 6, 7 and 8 may be placed to form a schematic circuit diagram showing one species of the invention as used in a simple local connection between two subscriber stations.

FIG. 1
*Local connection*

The operation of the start dial means in an arrangement according to Fig. 1 is as follows. The subscriber removes his receiver from the hook switch 600 and thereby establishes a circuit from negative battery, the upper winding of the L, line relay 601, armature 2 and back contact of the CO, cut off relay 602, the tip side of the line, the hook switch 600, the dial contacts 603, the transmitter 604, the armature and back contact of the polarized relay 605, the ring side of the line, the back contact and armature 3 of the CO relay 602, the lower winding of the L relay 601 to the positive or grounded side of the battery. Current flowing in this circuit also traverses the winding of the polarized relay 605 but with battery connected to the tip of the line and ground connected to the ring this polarized relay 605 remains in its normal position as shown in which the lamp 606 is short circuited so that the start dial signal is not displayed at this time.

The line relay 601 operates and establishes a circuit from positive battery, armature 1 and front contact of line relay 601, armature 1 and back contact of the LO lockout relay 607, the AST start wire 608 to the allotter and circuit of the line finder here indicated by the rectangle 609. This conventional circuit grounds the start lead 610 and causes the operation of the ST start relay 611 which bridges the tip and ring conductors leading to the associated selector from tip, front contact and armature 2 of the ST relay 611, resistor 612, normal contacts of armature 2 of the SW relay 613 to the ring conductor. It will be understood that this seizes the selector and that presently the selector will return a ground on the sleeve so that the SW relay 613 will be included in a circuit from the sleeve conductor S, the winding of the SW relay 611, armature 1 and front contact of the ST relay 611 and, as soon as the starting ground is removed from the start wire 610, through the winding of the ST relay 611 to battery, thus energizing the SW relay 613 and maintaining the ST relay operated. The ground on the sleeve conductor is now returned over front contact and armature 3 of the SW relay 613, over back contact and armature 2 of the LO relay 607, front contact and armature 2 of the L relay 601, the winding of the CO relay 602 to battery whereby this relay cuts off the line relay so that the calling line may derive its current from the selector. The CO relay in operating locks through its armature 4 and front contact to the sleeve conductor and through its armature 1 and front contact operates the LO relay 607, to free the starter wire 608.

Figure 7:
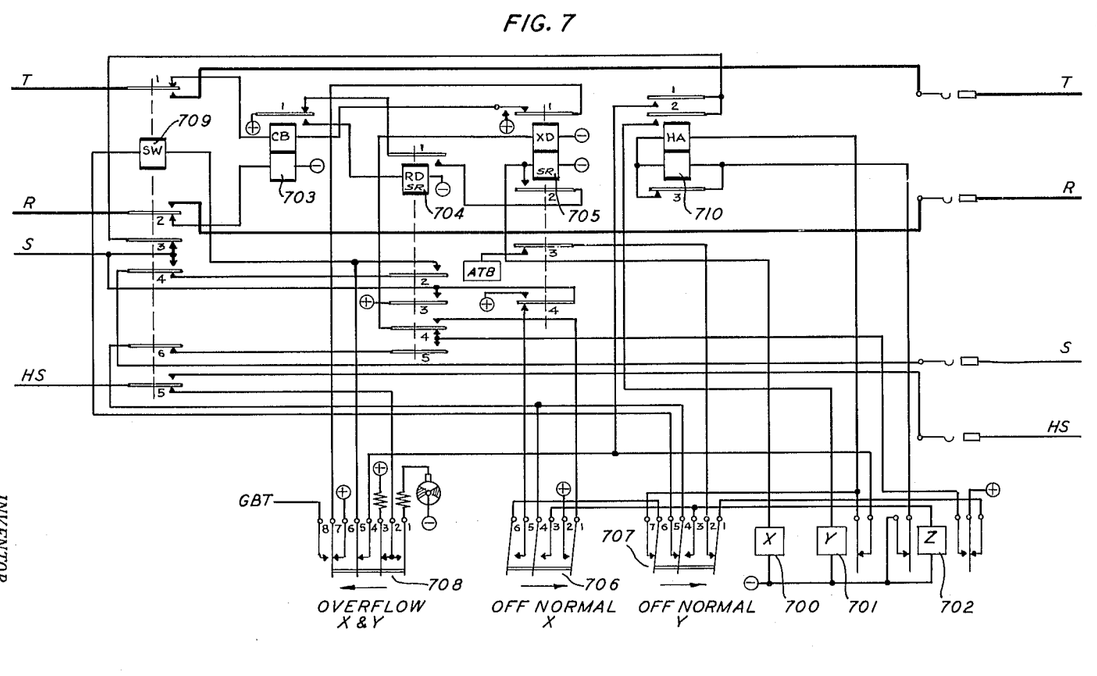
Fig. 7 is a schematic circuit diagram showing the elements of a conventional selector of the type employed in the XY step-by-step system.
Figure 7A:
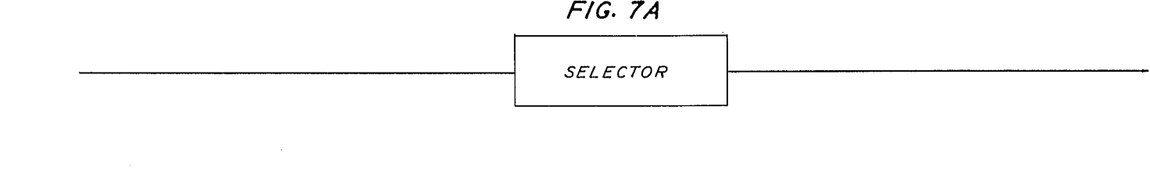
Fig. 7A is a bracketing label for the circuits described in the above Fig. 7.

The selector of Fig. 7 is conventional. It has an X magnet 700 for moving its wipers in the X direction, a Y magnet 701 for moving its wipers in the Y direction and a Z magnet 702 for releasing the wipers. It has a calling battery CB relay 703 which will operate and respond to dial pulses and a first slow release RD relay 704 and a second slow release XD relay 705. There is a set of X off normal springs 706, a set of Y off normal springs 707 and a set of X and Y overflow springs 708.

When the selector is seized as hereinbefore stated and the CO relay 602 of the line circuit has operated, current flows from the positive grounded battery, springs 6 and 7 of the overflow set 708, armature 1 and back contact of the XD relay 705, upper winding of the CB relay 703, back contact and armature 1 of the SW relay 709, the tip conductor, through the circuit of the line finder and the line circuit to the substation back over the ring conductor armature 2 and back contact of the SW relay 709, lower winding of the CB relay 703 to negative battery.

At the substation, the current flow is thus reversed and since the polarized relay responds the short circuit will be removed from about the start dial lamp 606 and consequently this lamp will glow to signal the subscriber that he may proceed to operate his dial.

In the selector circuit the CB relay 703 responds and causes the operation of the first slow RD relay 704 in an obvious circuit. Through its armature 3 and front contact the RD relay 704 returns the ground on the sleeve conductor to signal the proper seizure of the selector and to operate the cut through relay in the line finder as described. A circuit is now established from ground, springs 2 and 1 of the X off normal set 706, front contact and armature 4 of RD relay 704, upper winding of the second slow XD relay 705 so that both the slow relays are thus operated.

The subscriber now dials. As the dial is moved off normal the dial off normal springs 614 short circuit the lamp 606 to improve the dial pulse transmission and also to avoid any flickering of the lamp 606. In the selector circuit the CB relay 703 responds by releasing at each break in the circuit caused by the dial springs 603. Upon the first such release a circuit is established from ground armature 1 and back contact of the CB relay 703, armature 1 and front contact of the RD relay 704, armature 2 and front contact and lower winding of the XD relay 705, which circuit becomes effective as soon as the first step in the X direction has been taken and operates to hold the XD relay until this first train of pulses has terminated. This ground through armature 2 of the XD relay 705 is also extended through the X magnet 700 to step the wipers of this selector in the X direction. Thus the selector is moved in the X direction to select a given level so that shortly after the last pulse of the train the XD relay 705 whose upper winding has been released by the movement of the X off normal springs 706 will now be released by the steady energization of the CB relay 703.

The Y magnet 701 will now be automatically operated to move the wipers of the selector into connection with an idle outgoing line in the selected level. Upon the release of the XD relay 705, a circuit is established from negative battery, the contacts controlled by the Z magnet 702, the armature 3 and back contact and the upper winding of the HA relay 710, contacts 7 and 6 of the Y off normal set 707, contacts 6 and 5 of the X off normal set, back contact and armature 4 of the XD relay 705, front contact and armature 3 of the RD slow release relay 704 to ground. The HA relay 710 operates and closes a circuit for the Y magnet 701 from battery, the winding of the Y magnet, front contact and armature 2 of the HA relay 710, the armature 3 and back contact of the SW relay 709, to the grounded sleeve from the line finder and after the first step in the Y direction also through armature 1 and front contact of the HA relay 710, springs 4 and 5 of the overflow set 708, front contact and armature 2 of the RD relay 704, back contact and armature 4 of the SW relay 709 to the grounded sleeve of the busy outgoing lines. Upon the operation of the Y magnet 701, and Y off normal set 707 operates to open the circuit of HA relay 710 so that this relay releases to in turn release the Y magnet 701.

Upon this first step in the Y direction the SW relay 709 is set up in a circuit to detect the first idle trunk and to thereupon stop the automatic action. This circuit may be traced from ground, armature 3 and front contact of the RD relay 704, armature 4 and back contact of the XD relay 705, springs 5 and 6 of the X off normal set 706, springs 6 and 5 of the Y off normal set 707 to one terminal of the SW relay 709, and from the other terminal thereof to a divided circuit, one branch of which extends through the front contact and armature 2 of the RD relay 704, the back contact and armature 4 of the SW relay 709 to the sleeve wiper of the selector where it encounters ground on each busy trunk and the other branch of which may be traced through springs 5 and 4 of the overflow set 708, the springs controlled by the Y magnet 701 after this magnet has become deenergized, the upper winding of the HA relay 710, the back contact and armature 3 thereof, the springs controlled by the Z magnet 702 to battery. As long as busy outgoing lines are encountered the HA relay 710 will operate as soon as the Y magnet becomes deenergized and will start another stepping movement at the same time holding the SW relay 709 short circuited, but as soon as an idle trunk is reached then the SW relay 709 and the HA relay 710 are effectively placed in series. The resistances of these two relays (SW is comparatively higher than HA) is such that the SW relay 709 operates and the HA relay 710 remains unoperated. Thereupon the tip ring and sleeve are cut through to the circuit selected (in this case a connector) and the CB relay 703 and, shortly thereafter, the RD relay 704 release. Sleeve ground to hold the SW and HA relays operated is thereafter derived from the connector so that the connection established will be maintained until released by the removal of this ground in the connector.

Figure 8:
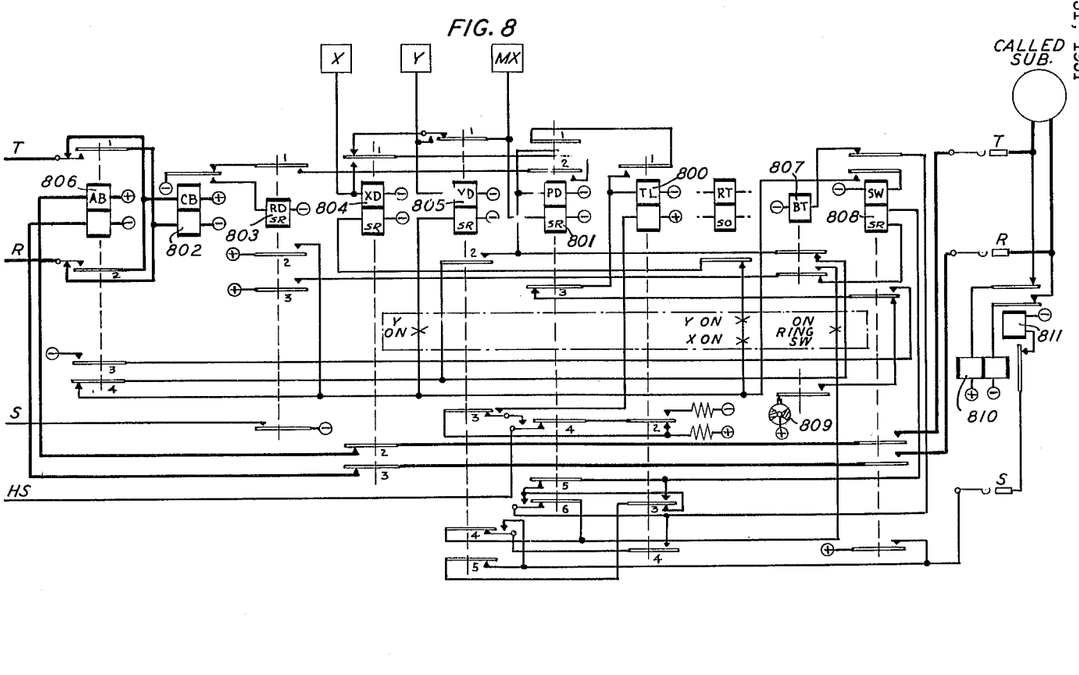
Fig. 8 is a schematic circuit diagram showing the elements of a conventional connector and a called subscriber substation reached thereover.
Figure 8A:
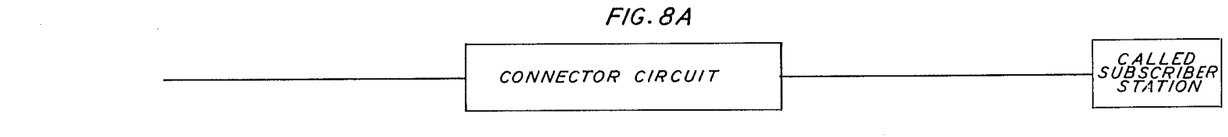
Fig. 8A is a bracketing label for the circuits described in the above Fig. 8.

The connector of Fig. 8 is conventional and consequently the circuit has been skeletonized to make the operations in respect to the present invention more clear. When the circuit is seized ground through the upper winding of the CB relay 802 is connected to the tip of the line and battery through the lower winding is connected to the ring of the line so that the polarized relay at the substation (or as will hereinafter appear, the polarized relay in the first selector) will operate and cause the start dial lamp to glow to signal the subscriber that he may proceed with the operation of the dial.

When the connector is seized a circuit is established from ground, back contact and armature 2 of the TL relay 800, armature 4 and back contact of the PD relay 801 to the HS lead so that as soon as the selector of Fig. 7 is switched through this ground connection will be extended backward toward circuits with which we are not concerned in a local connection but which are of importance in an extended connection as will appear hereinafter. The CB relay 802 is operated over the tip and ring and the four slow releasing relays immediately operate, the RD relay 803 which holds during the use of the connector, the XD relay 804 which is associated with the X magnet and releases after the end of the first train of dialing pulses, the YD relay 805 which is associated with the Y magnet and releases after the end of the second train of dial pulses and the PD relay 801 which is associated with the MX magnet of the minor ringing current selector and which releases at the end of the third train of dial pulses. For the sake of simplicity the off normal contacts are each shown as an X drawn across a conductor and it will be understood that each is normally closed until the first movement in the indicated direction is taken.

After the connector has been seized and during the transmission of the first train of pulses thereto, a connection is extended from battery, resistance 614 in the line circuit thence over the HS lead through the line finder and selector in this local connection to front contacts of armature 4 of the PD relay 801 to front contacts of the armature 3 of the YD relay 805 and the lower winding of the TL relay 800 to cause this relay to operate. The TL relay locks through its upper winding, its front contact and armature 1, the armature 1 and front contact of the PD relay 801, the front contact and armature 2 of the YD relay 805, the armature 4 and back contact of the AB relay 806 to the main ground lead supplied from armature 2 and front contact of the RD relay 803. The TL relay 800 remains operated until the end of the second train of pulses. At this time the BT relay 807 is connected to the sleeve of the called line at the end of the second digit (and before the YD relay 805 can release) over the front contacts of the armature 4 of the YD relay 805, armature 4 and front contact of the TL relay 800, the armature 1 and back contact of the SW relay 808 to the winding of the BT relay 807 and thence to the battery. Therefore, if the called line is busy the BT relay operates and locks through its own front contact and armature 2 to a ground supplied by armature 3 of the RD relay 803.

At this point it may be noted that after the subscriber has dialed the last digit, battery will be connected to the ring of the line and ground connected to the tip thereof through the windings of the CB relay 802 so as to display the start dial signal. This therefore acts somewhat in the capacity of a supervisory signal to the calling subscriber and will glow until the called subscriber answers. If the called line is busy the BT relay will operate and so at the end of the third train of pulses and when the PD relay releases, a circuit is established from ground and interrupter 809, armature 3 and front contact of the BT relay 807, back contact and armature 3 of the SW relay 808, back contact and armature 3 of the PD relay 801 to the upper winding of the TL relay 800, whereby the TL relay will follow the interrupter and alternately connect battery and ground to the HS lead at its armature 2. This will bring no response at the calling station in a local connection, but in an extended connection involving one or more long lines this will cause the start dial signal at the calling station to flash as will be more fully described hereinafter.

If the called line is idle then a circuit is established after the third train of dial pulses from ground, armature 3 and front contact of the RD relay 803, armature 2 and back contact of the BT relay 807, lower winding of the SW relay 808, armature 5 and back contact of the PD relay 801, back contact and armature 3 of the TL relay (now released), armature 5 and back contact of the YD relay 805, the sleeve wiper of the connector, the armature and back contact of the LR relay 810, the winding of the CO relay 811 to battery. The SW relay 808 and the CO relay 811 operate together. The SW relay 808 places a firm ground on the sleeve at its armature 6 and locks through its upper winding and armature 2 to the main ground of the connector.

Until the called party answers the start dial signal at the calling substation will remain displayed as above described. When the called subscriber answers the AB relay 806 responds and reverses the current in the tip and ring toward the selector for conventional purposes (such as to operate a message register) as well as to operate the polarized relay at the substation to stop the display of the start dial signal. The AB relay 806 also places ground on the front contact of the armature 3 of the SW relay 808 to operate the TL relay 800. This changes the HS lead from ground to battery for purposes which will appear hereinafter.

Other connections in the connector such as the talking circuit from the incoming terminals to the wipers are not shown but will be readily understood by those skilled in the art.

Thus it will appear that in the arrangement of Fig. 1 the lamp will not light when the receiver (not shown) is taken off the hook, but as soon as the line finder has picked up the calling line and extended the connection to an associated selector the reversal of the line current will operate the polarized relay and cause the lamp to light. The lamp will light when the connector is seized and will remain lighted until the called subscriber answers. It is to be noted that means are provided to short circuit the lamp during transmission periods such as the dialing period and the talking period.

It will further be noted that in the line circuit the tip and ring conductors in the line finder bank are reversed as they appear in the connector bank so that when such a station is taken as a called substation its start dial lamp will be kept dark. If it is desired to keep the line circuit wired conventionally, then the battery and ground connections to the called line circuit in the connector may be reversed for the same purpose.

FIG. 9

Fig. 9 is an alternative substation circuit in which the lamp 900 is lighted by current from a local source of current 901. This may be of any desired nature such as dry batteries, wet cells, or any modern form of commercial electric supply current driven arrangement. This arrangement has certain advantages in the quality of illumination achieved which will be appreciated by those skilled in the art. Otherwise the apparent operation of the substation set is the same as that hereinbefore described.

FIG. 14

Fig. 14 is another alternative substation arrangement wherein a latch is employed to hold the dial in any position to which it has been moved by the subscriber until the start dial signal is received whereupon the dial is freed and allowed to operate in a normal manner. A polarized relay 1400 is provided to move an arm 1401 terminating in a latch which will in its normal position engage the teeth 1402 affixed to the dial. When the line current is reversed with ground on the tip and battery on the ring the polarized relay 1400 will lift the latch 1401 and allow the dial to operate normally. While it is preferable to allow the dial to be freely operated by the subscriber and to restrain its return movement, it is also contemplated that by a slightly different arrangement the setting movement may also be inhibited so that the subscriber will be prevented from moving the dial. It is further contemplated that the start dial lamp and the mechanical latch may be combined in the same substation arrangement.

FIG. 2

Local connection—polarized relay in selector

Figure 2:
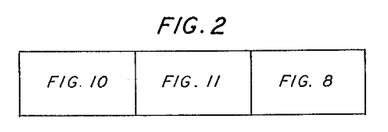
Fig. 2 is a block diagram showing how Figures 10, 11 and 8 may be placed to form a schematic circuit diagram showing another species of the invention as used in a simple local connection.

The arrangement in accordance with Fig. 2 involves another alternative substation circuit in which the apparatus thereat is reduced to a minimum, merely a lamp and an impedance coil. As shown in Fig. 10 the impedance coil 1000 will be bridged across the line from tip to ring when the hook switch is operated. If from a center tap to this coil a lamp is included in a circuit to ground, this lamp may be lighted by alternating current of a suitable frequency applied to both the tip and ring conductors. The simplex circuit theory is conventional and the manner of its operation is well known. By this method, then, the substation apparatus is reduced to a small number of rugged parts and the necessary polarized relay is moved back to the first selector circuit where maintenance facilities are better and the number required is smaller. The line circuit comprising the line relay 1002, the cut off relay 1003 and the lockout relay 1004 is conventional and it will be noted that the current source connections to the line relay are not reversed as in Fig. 6. The line finder arrangements are conventional and the same as have hereinbefore been described.

Figure 11:
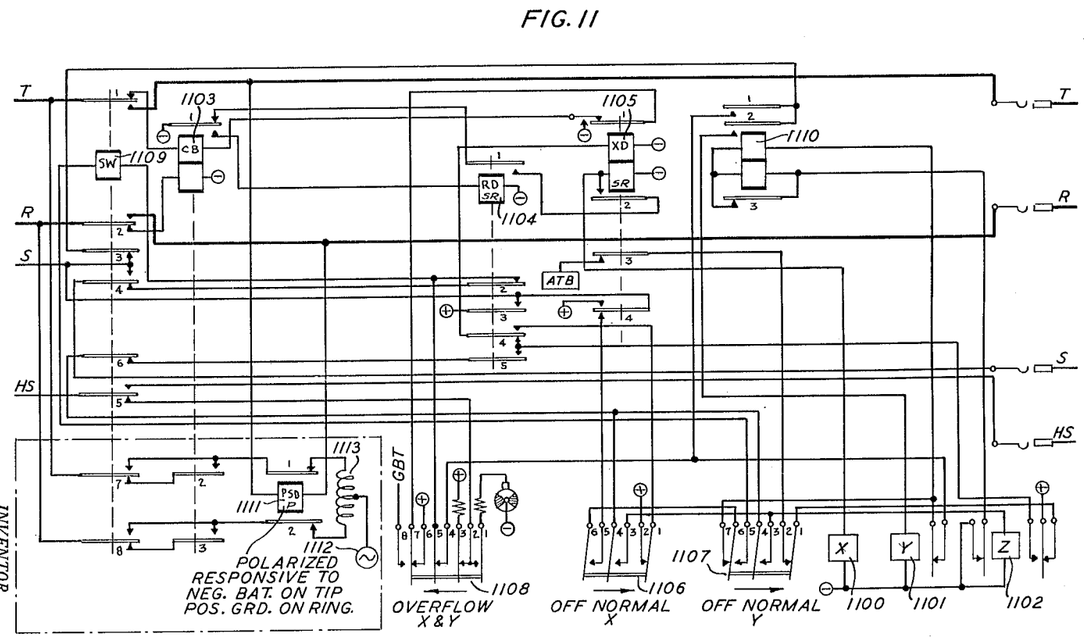
Fig. 11 is a schematic circuit diagram of a selector circuit, similar to that of Fig. 7, but modified to operate with the substation shown in Fig. 10.
Figure 11A:
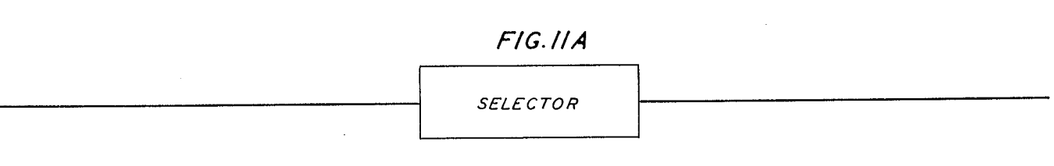
Fig. 11A is a bracketing label for the circuits described in the above Fig. 11.

The important change is the addition in the selector circuit, Fig. 11 of the PSD (polarized start dial) relay 1111. Thus in the operation of the system of Fig. 2 the lamp 1001 will not light until the first selector has been reached. When in due course the CB relay 1103 is operated a circuit will be established from a source of alternating current 1112, the center tap of an impedance coil 1113 and thence equally over back contacts and armatures of the PSD relay 1111, front contacts and armatures of the CB relay 1103, and back contacts and armatures of the SW relay 1109 to the tip and ring conductors to light the lamp 1001 at the substation. The PSD relay 1111 is connected to the tip and ring wipers of the selector and will remain in the position shown with ground on the tip and battery on the ring. When the selector is cut through the SW relay makes a direct connection between the tip and ring conductors and the armatures of the PSD relay 1111 so as to maintain the start dial lamp circuit after the CB relay has released. The operation of the connector of Fig. 8 is exactly as hereinbefore described. When the called subscriber answers the AB relay 806 operates and reverses the line current so that the PSD relay 1111 operates and opens the lamp lighting circuit. It will thus be noted that all connections to the source of alternating current 1112 are opened during the conversational period.

FIG. 3

Extended connection

In accordance with this arrangement the selector of Fig. 7 is set by the first train of pulses on a trunk leading to a long line at the end of which there will be a line finder. Hence the apparatus for further extending the connection may not be immediately ready to receive the next train of dial pulses. The subscriber after taking his receiver off the hook will observe the start dial signal when the selector of Fig. 7 is ready and will therefore transmit the first train of pulses. This will set the selector on the trunk of Fig. 12 whereupon the appearance of the start dial signal will be delayed until the line finder at the distant end has operated and made the next selector ready. This will occur as follows.

Figure 12:
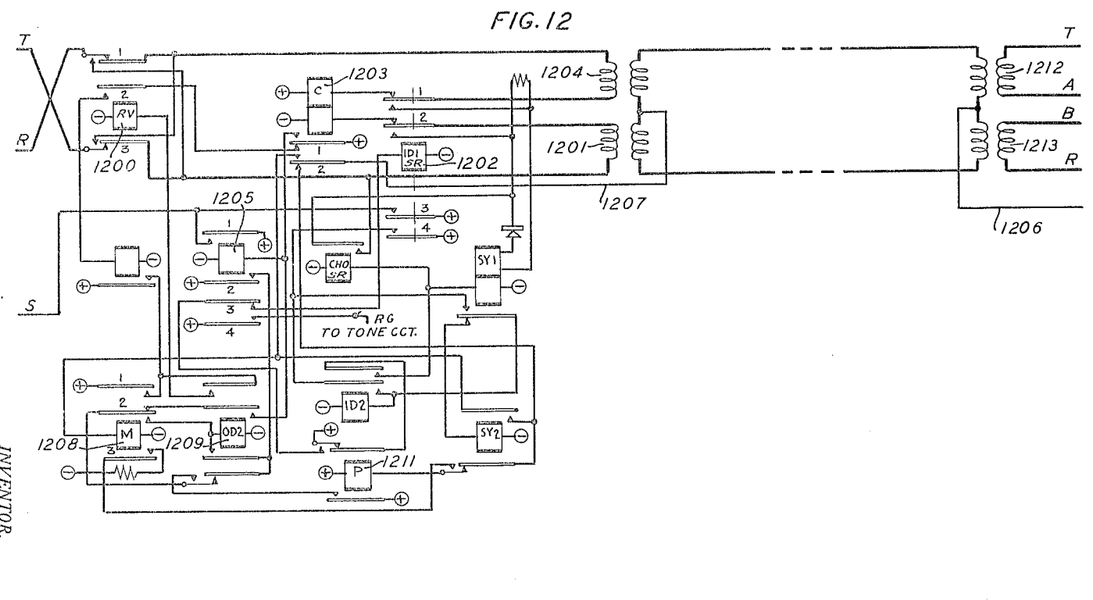
Fig. 12 is a schematic circuit diagram of a trunk circuit reached over a selector such as that shown in Fig. 7 or Fig. 11, together with the near end arrangements and the far end arrangements of a simplex circuit toll line.
Figure 12A:
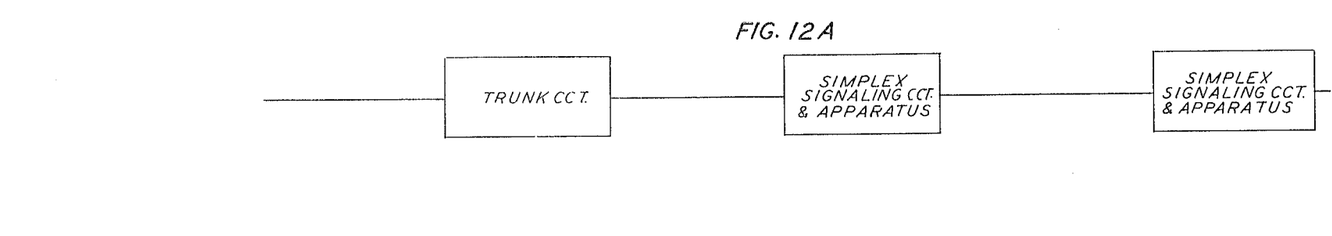
Fig. 12A is a bracketing label for the circuits described in the above Fig. 12.
Figure 13:
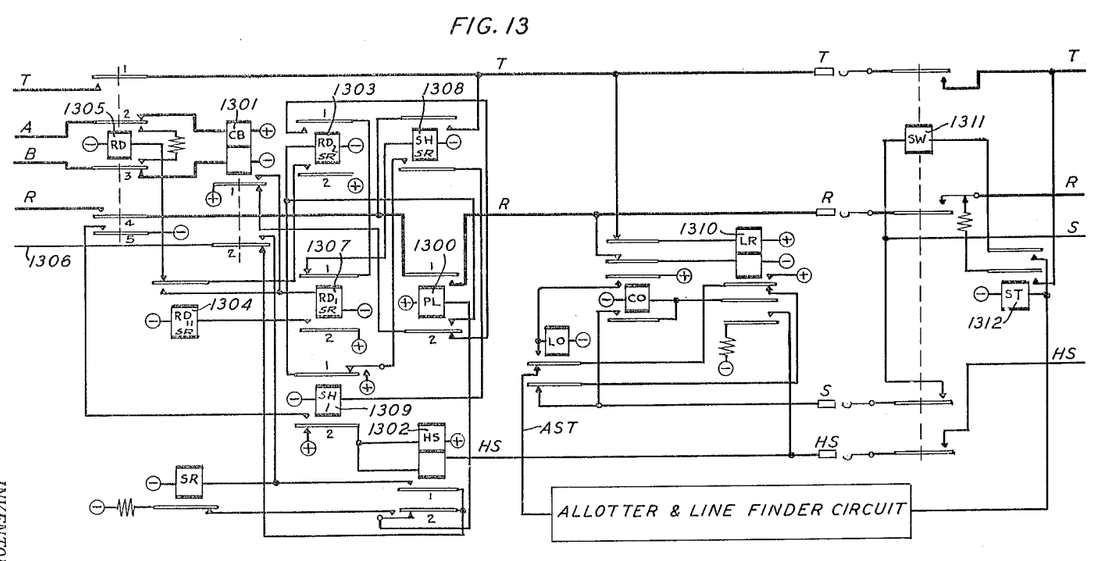
Fig. 13 is a schematic circuit diagram showing the essential circuit elements of a trunk circuit connected to the distant end of the simplexed toll line of Fig. 12, a line circuit operated thereover and a line finder operated in turn by said line circuit, the conventional allotter arrangements and the apparatus and most of the circuits of said line finder being indicated by a labelled rectangle.
Figure 13A:
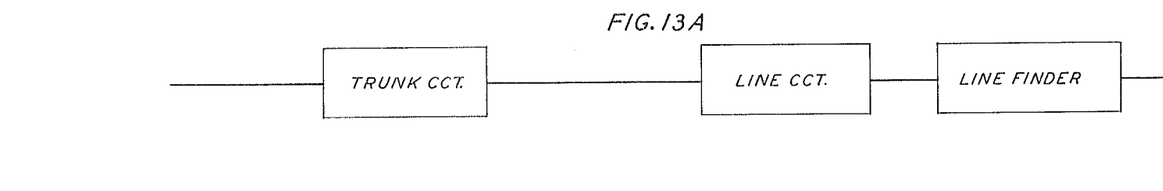
Fig. 13A is a bracketing label for the circuits described in the above Fig. 13.

When this trunk is selected it will be found that the tip is connected through the back contact and armature 3 of the RV relay 1200, lower winding 1201 of the repeating coil, armature 2 and back contact of the ID–1 relay 1202, the lower winding of the C relay 1203 to battery. In like manner the ring is connected through the back contact and armature 1 of the RV relay 1200, the upper winding 1204 of the repeating coil armature 1 and back contact of the ID–1 relay 1202 and the upper winding of the C relay to ground, whereby the polarized relay 605 is held in its normal position as shown so that the lamp 606 is dark. The C relay 1203 operates the slow releasing OD–1 relay 1205 and this relay in turn places ground on the sleeve from its armature 1. At the distant end of the long line it will appear that the conductor 1206 is connected to a grounded PL relay 1300 so that a circuit is now established from such a ground over the simplex circuit conductor 1207, armature 2 and front contact of the C relay 1203 and the winding of the M relay 1208 to battery, thus energizing both the distant P relay 1300 and the M relay 1208. The M relay now causes the operation of the OD–2 relay 1209 from ground, armature 2 and front contact of the OD–1 relay 1205, armature 4 and back contact of the OD–2 relay 1209, armature 2 and front contact of the M relay 1208 to the winding of the OD–2 relay 1509 which immediately locks through its front contact and armature 3 to the ground on armature 2 of the OD–1 relay 1205. However, it is to be noted that the operation of the M relay at this time is transitory and only serves to energize the OD–2 relay for almost immediately the distant end of the simplex circuit is changed from a ground to battery to maintain the stop dial signal indication, by releasing the M relay 1208 to prevent the operation of the RV relay 1200.

The circuit of Fig. 12 remains in this condition until the line finder at the incoming end of the simplex circuit has succeeded in connecting a selector thereto and that selector is made ready to receive the dial pulses. Thereupon a ground connection is made to conductors 1206 and 1207 and the M relay 1208 is energized. A circuit is then completed from ground, armature 1 and front contact of the M relay 1208, armature 1 and front contact of the OD–2 relay 1209, the winding of the RV relay 1200 to battery to operate this latter relay to cause the line to be reversed so that the start dial signal may be displayed. Since the M relay has no slow releasing characteristics, the ground supplied by its armature 1 is fortified by a ground from the slow releasing RVD relay 1210 during dialing.

When the subscriber gets the start dial signal he operates his dial and the C relay 1203 follows the train of pulses, releasing on each so-called pulse. Armature 1 opens the circuit of the OD-1 relay 1205 but this relay, being slow to release, holds over. Armature 2 of the C relay 1203 changes from a battery connection (through the winding of the M relay 1208) to a ground connection (through the winding of the P relay 1211 without operating the latter) and thus causes the distant PL relay 1300 to follow the train of dial pulses. Thereafter the C relay remains operated so that the M relay 1208 is responsive to the start and stop dial or the supervisory signals from the distant end of the connection. The continued operation of the OD-1 relay 1205 holds ground on the sleeve until the bridge is removed to allow the release of the C relay 1203.

At the distant end of the long line the incoming trunk thereat is seized by the application of battery to the simplex circuit conductor 1206, extended over armature 2 and back contact of the CB relay 1301, armature 2 and back contact of the HS relay 1302 and the winding of the PL relay 1300. The PL relay responds and closes a dialing contact in the ring conductor by its armature 1. A circuit is now extended from ground, armature 1 and back contact of the CB relay 1301, armature 2 and front contact of the PL relay 1300, to the winding of the slow releasing RD-2 relay 1303. This relay extends ground from its armature 2 and front contact over the armature and back contact of the RD-11 relay 1304 and thence through the winding of the RD relay 1305 to battery. The RD relay operates and completes a bridge across the line through the repeating coil windings 1212 and 1213 and the resistor 1306.

When dialing takes place the PL relay responds to each pulse by releasing. On the first release of this relay the ground on its armature 2 is extended over the front contact and armature 1 of the RH-2 relay 1303, the back contact and armature 1 of the RD-1 relay 1307 and thence through the winding of the SH relay 1308. This relay places a direct bridge on the line back of the PL relay pulsing contact, for more positive transmission of the dial pulses. On the next and following closures of the line the ground for operating the RD-2 relay 1303 is also transmitted over the armature 1 and back contact of the SH-1 relay 1309, the front contact and armature 2 of the SH relay 1308 and thence to the winding of the SH-1 relay 1309 which operates and locks in during the dialing period under control of the SH relay 1308. With the RD relay 1305 and the SH-1 relay 1309 operated the HS relay 1302 is operated to supply battery to the simplex wire circuit 1206 to display a stop dial signal during this dialing period.

The remainder of the circuit of Fig. 13 is exactly like that of Fig. 6. The line relay 1310 responds to the seizure of the incoming trunk and places a battery potential on the HS conductor for a stop dial signal. The AST starter wire to the allotter is grounded and the line finder is caused to hunt for the calling line. When the switching SW relay 1311 is operated by the start ST relay 1312 the selector of Fig. 7 is seized and when ready will apply ground to the HS lead to release the HS relay 1302 and thereby transmit the start dial signal to the subscriber.

The remainder of the circuit shown in Figs. 7 and 8 has been fully described. Thus it will appear that when the selector of Fig. 7 is employed as an incoming selector the HS lead is usefully employed and as the TL relay 800 of the connector operates when the AB relay 806 operates the start dial signal lamp at the calling substation is properly operated, from the connector back through the selector of Fig. 7, the line finder and the trunk of Fig. 13 over the HS lead and thence to the RV reversing relay 1200 over the simplex circuit.

FIG. 4

*Extended connection*

*Polarized relay in selector*

Figure 3:
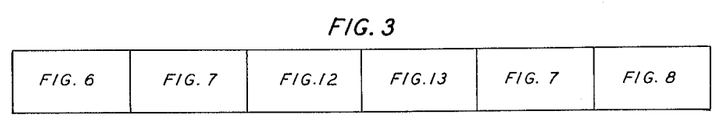
Fig. 3 is a block diagram showing how Figures 6, 7, 12, 13, 7 and 8 may be placed to form a schematic circuit diagram showing one species of the invention as used in an extended connection including a long line and a selecting means requiring a halt or pause in the operation of the dial by the calling subscriber.
Figure 4:
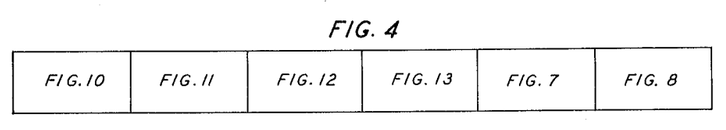
Fig. 4 is a similar block diagram showing how Figures 10, 11, 12, 13, 7 and 8 may be placed to form a schematic circuit diagram showing another species of the invention.

It is believed that the operation of a system in accordance with the arrangement of Fig. 4 will be readily apparent. Each of the figures has been fully described and the system differs from that of Fig. 3 only in that the substation circuit and the arrangement of the polarized relay in the first selector are provided to give a more economical system employing a smaller number of parts at the substation.

At the substation the start dial lamp will light when the first selector of Fig. 11 has been seized and is ready for operation. When this selector makes connection to the trunk of Fig. 12 the start dial lamp will go out until the line finder of Fig. 13 successfully seizes the incoming selector of Fig. 7 whereupon the line is reversed by the RV relay 1200 over the HS lead and the simplex circuit. The start dial signal indication is then displayed until the connector is set and the called subscriber answers, whereupon the TL relay 800, following the AB relay 806 releases the RV relay 1200 to establish the normal talking connection with the start dial signal lamp dark.

FIG. 5

*Connection extended through a plurality of long lines*

Figure 5:
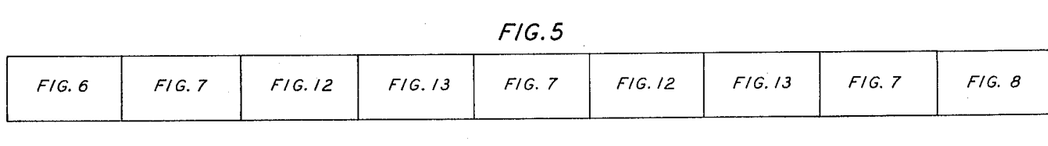
Fig. 5 is a block diagram showing how Figures 6, 7, 12, 13, 7, 12, 13, 7 and 8 may be placed to form a schematic circuit diagram showing the invention involved in an extended connection including a plurality of long lines each employing a selecting means requiring a stop dial indication for each link of the connection.

Here again it is believed that the system of Fig. 5 will be readily understood as all the figures used therein have been fully described. Fig. 5 is an indication of a system in which a plurality of long lines are employed in which the start dial substation lamp will light up each time a selector or a connector has been properly seized and is ready for operation. In this particular case the lamp will light first when the local first selector (the first Fig. 7) has been seized, second when the first incoming selector (the second Fig. 7) has been seized, third when the second incoming selector (the third Fig. 7) has been seized, fourth when the connector has been seized and will go dark when the called subscriber answers.

Since it is conventional to use a reversal of the line for operating a message register it will be appreciated that by the systems of the present invention the circuits of the local and extended lines may be arranged in zones so that the calling line message register will be operated one or more times in accordance with the length of the connection established, thus automatically charging the calling subscriber for his local or toll connections.

What is claimed is:

1. In a dial telephone system, a common battery subscriber's station, a line circuit therefor including connections for transmitting current of a first polarity to said station, selectors for extending connections from said station each including connections for transmitting current of a second polarity to said station, connectors accessible to said selectors each including connections for transmitting current of a second polarity to said station and means for reversing the polarity thereof, trunk circuits leading to long lines accessible to said selectors each including connections for transmitting current of a first polarity to said station and means for reversing the polarity thereof, said subscriber's station including a dial for controlling said selectors and said connectors, a start dial signal, and polarized means responsive to the polarity of current transmitted to said station for controlling said signal.

2. In a dial telephone system, a common battery subscriber's station, a line circuit therefor including connections for transmitting current of a first polarity to said station, selectors for extending connections from said station each including connections for transmitting current of a second polarity to said station, connectors accessible to said selectors each including connections for transmitting current of a second polarity to said station and means for reversing the polarity thereof, trunk circuits accessible to said selectors each including connections for transmitting current of a first polarity to said station and means for reversing the polarity thereof, said trunk circuits each connected to a long line terminating in means for extending a connection thereover to one of said selectors whereby a connection may be extended from said station over a long distance through said selectors, said trunk circuits and said connectors and whereby the polarity of current transmitted to said station is changed accordingly as the said connection is extended step by step, said station including a dial for controlling said selectors and said connectors, a start dial signal, and polarized means responsive to the polarity of current transmitted to said station for controlling said start dial signal.

3. In a dial telephone system, a common battery subscriber's station, selectors for extending connections from said station each including connections for transmitting current of a second polarity to said station, connectors accessible to said selectors each including connections for transmitting current of a second polarity to said station and means for reversing the polarity thereof, trunk circuits accessible to said selectors each including connections for transmitting current of a first polarity to said station and means for reversing the polarity thereof, said trunk circuits each connected to a long line terminating in means for extending a connection thereover to one of said selectors whereby a connection may be extended from said station over a long distance through a series of said selectors, said trunk circuits and said connectors, a dial at said station for controlling said selectors and said connectors, polarized means responsive to the polarity of current transmitted to said station and signal means responsive thereto.

References Cited in the file of this patent

UNITED STATES PATENTS

| | | |
|---|---|---|
| Re. 22,441 | King et al. | Feb. 22, 1944 |
| 650,487 | Scribner | May 29, 1900 |
| 1,107,140 | Clement | Aug. 11, 1914 |
| 1,897,106 | Bascom | Feb. 14, 1933 |
| 1,914,124 | Harper | June 13, 1933 |
| 2,244,500 | Nyquist | June 3, 1941 |
| 2,569,650 | Balzer | Oct. 2, 1951 |